(12) United States Patent
Spyche, Jr. et al.

(10) Patent No.: US 10,100,896 B2
(45) Date of Patent: Oct. 16, 2018

(54) HYDRAULIC ENERGY ABSORPTION DEVICE WITH A DISPLACEABLE ACCUMULATOR

(71) Applicant: KYNTEC CORPORATION, Cheektowaga, NY (US)

(72) Inventors: Gerald J Spyche, Jr., Orchard Park, NY (US); Joseph A Schoen, Clarence, NY (US)

(73) Assignee: KYNTEC CORPORATION, Cheektowaga, NY (US)

( * ) Notice: Subject to any disclaimer, the term of this patent is extended or adjusted under 35 U.S.C. 154(b) by 0 days.

(21) Appl. No.: 15/349,695

(22) Filed: Nov. 11, 2016

(65) Prior Publication Data

US 2017/0130799 A1 May 11, 2017

Related U.S. Application Data

(60) Provisional application No. 62/253,814, filed on Nov. 11, 2015.

(51) Int. Cl.
*F16F 13/00* (2006.01)
*F41A 3/90* (2006.01)

(52) U.S. Cl.
CPC ........ *F16F 13/007* (2013.01); *F16F 2232/08* (2013.01); *F16F 2236/04* (2013.01); *F41A 3/90* (2013.01)

(58) Field of Classification Search
CPC ........... F16F 9/082; F16F 9/088; F16F 13/007
USPC ...................................................... 188/314
See application file for complete search history.

(56) References Cited

U.S. PATENT DOCUMENTS

| 3,469,661 A | | 9/1969 | Hoffmann et al. | |
| 3,625,321 A | * | 12/1971 | Lutz ...................... | B60G 15/00 188/298 |
| 3,722,639 A | | 3/1973 | Keijzer et al. | |
| 3,799,530 A | * | 3/1974 | Stembridge ............. | F16F 9/063 267/119 |
| 3,826,343 A | * | 7/1974 | Heymann ............. | F16F 9/3214 188/282.8 |
| 3,944,197 A | * | 3/1976 | Dachicourt ............. | F16F 9/088 188/276 |
| 4,132,395 A | * | 1/1979 | Fox, Jr. ................... | F16F 9/088 137/539 |

(Continued)

FOREIGN PATENT DOCUMENTS

GB       2221011 A    1/1990

*Primary Examiner* — Thomas J Williams
(74) *Attorney, Agent, or Firm* — Bond, Schoeneck & King, PLLC

(57) ABSTRACT

A hydraulic energy absorption device including a cylindrical housing having an interior hollow compartment, the interior hollow compartment having a distal end and a proximal end, a resilient member arranged within the distal end of the cylindrical housing, a piston arranged adjacent to the resilient member within the cylindrical housing, the piston including a piston head and a piston rod extending from the piston head toward the proximal end and a compressible accumulator arranged within the cylindrical housing and connected to the piston. When the piston rod is displaced toward the distal end of the cylindrical housing in operation, the piston head and the compressible accumulator are displaced toward the distal end of the cylindrical housing.

18 Claims, 9 Drawing Sheets

(56) References Cited

U.S. PATENT DOCUMENTS

| | | | | |
|---|---|---|---|---|
| 5,074,389 | A * | 12/1991 | Slocum | F16F 5/00 |
| | | | | 188/277 |
| 5,257,680 | A | 11/1993 | Corcoran et al. | |
| 5,376,135 | A * | 12/1994 | Aulie | A61F 2/68 |
| | | | | 188/314 |
| 7,066,310 | B2 * | 6/2006 | Mintgen | E05C 17/305 |
| | | | | 188/298 |
| 7,131,367 | B1 | 11/2006 | Boerschig et al. | |
| 8,485,326 | B2 * | 7/2013 | Miyasato | F16F 9/19 |
| | | | | 188/284 |
| 8,757,338 | B2 * | 6/2014 | Miyasato | F16F 9/003 |
| | | | | 188/322.19 |
| 8,863,918 | B2 | 10/2014 | Murakami | |
| 8,997,954 | B2 * | 4/2015 | Rodenbeck | B60G 17/08 |
| | | | | 188/316 |
| 2009/0271946 | A1 | 11/2009 | Lam et al. | |
| 2011/0101585 | A1 | 5/2011 | Kamae | |
| 2012/0205208 | A1 | 8/2012 | Cultraro | |
| 2015/0152934 | A1 * | 6/2015 | Miyasato | F15B 15/1423 |
| | | | | 91/246 |

\* cited by examiner

HYDRAULIC ENERGY ABSORPTION DEVICE WITH A DISPLACEABLE ACCUMULATOR

CROSS-REFERENCE TO RELATED APPLICATIONS

This application claims the benefit of U.S. Provisional Patent Application Ser. No. 62/253,814, filed on Nov. 11, 2015 and entitled "Shock Absorber with Floating Accumulator", the entire disclosure of which is incorporated herein by reference.

FIELD OF THE INVENTION

The present disclosure is directed generally to recoil buffer devices and shock absorbing devices, and more specifically, to recoil buffer devices and shock absorbing devices with a displaceable accumulator.

BACKGROUND

Hydraulic shock absorbing devices are typically retained in a stationary bearing of the shock absorber. For example, prior hydraulic shock absorbers contain a stationary bearing in a cylindrical housing and retain a stationary accumulator that compensates for excess volume inside the cylindrical housing when a piston rod is introduced into the cylindrical housing.

However, hydraulic shock absorbing devices with stationary accumulators have the potential to wear and leak due to a premature failure of the media used for accumulation. Oil moves at a very high rate into stationary hydraulic chambers, which creates instability in the resistive force as the device's piston rod is stroked as well. In addition, the length of the bearing that supports the piston rod (and that retains the accumulator) remains constant, which makes the hydraulic shock absorbing device more likely to wear and leak due to the effect of side load caused by the system. Moreover, in shock absorbing devices with stationary accumulators, stationary fluid at a proximal end of the piston has to overcome back pressure associated with changing inertia of the fluid column to move into a stationary accumulator. This increases the response time of the accumulator, which creates unstable and harmonic forces as the product is stroked.

SUMMARY OF THE INVENTION

The present disclosure is directed to inventive devices for recoil buffer and shock absorption that include a moveable accumulator (i.e., is not stationary) along the longitudinal axis of the device. The disclosed designs provide advantages over prior designs by making the device more stable as it is stroked because the bearing length effectively increases, resulting in a more reliable and stable resisting force. Further, because the accumulator travels with the piston head, the compression of the accumulator is more stable and controlled, leading to a consistent/controlled compression of the accumulator. This helps stabilize fluid flow and irregularities associated with uncontrolled flow that an unconstrained open accumulator would have in prior designs. This controlled expansion and compression of the accumulator leads to more stable resistance forces and return forces, longer life, less wear, and reduced high frequency harmonics giving a more stable damping force.

Generally, in one aspect, a hydraulic energy absorption device is provided. The device includes a cylindrical housing member, a piston, and an accumulator. The cylindrical housing has a distal end and a proximal end along a longitudinal axis. The piston includes a piston head and a piston rod, where the piston head is slidably retained within the cylindrical housing, and the piston rod extends from the piston head through the proximal end of the cylindrical housing. The piston rod is configured to be engaged with an external body, the engagement being directly between the piston rod and body or through an intermediary component, such as a coupling, abutment, or other interface. The accumulator is coupled to the piston head or an integral part and collects fluid from the interior of the cylindrical housing displaced by the piston rod when the piston head moves toward the distal end of the cylindrical housing and the piston rod is introduced into the interior of the cylindrical housing.

According to an embodiment, the piston head includes an annular orifice or similar feature around the exterior of the piston head. In such embodiment, fluid in the interior of the cylindrical housing travels from one side of the piston head to the other via the annular orifice or various geometries as the piston head moves toward the distal end of the cylindrical housing.

According to an embodiment, the energy absorption device includes a cylinder within the cylindrical housing. In such embodiment, the cylinder has an interior surface, an exterior surface, and at least one orifice passing from the interior surface of the cylinder to the exterior surface of the cylinder to allow fluid to pass therethrough. Such embodiment includes a flow channel formed on an interior wall of the cylindrical housing that substantially extends along the length of the cylindrical housing and is in fluid communication with the accumulator.

Generally, in one aspect, an energy absorption device which is a hydraulic energy absorption device is provided. The hydraulic energy absorption device includes (i) a cylindrical housing having an interior hollow compartment, the interior hollow compartment having a distal end and a proximal end; (ii) a resilient member arranged within the distal end of the cylindrical housing; (iii) a piston arranged adjacent to the resilient member within the cylindrical housing, the piston including a piston head and a piston rod extending from the piston head toward the proximal end; (iv) and a compressible accumulator arranged within the cylindrical housing and connected to the piston. When the piston rod is displaced toward the distal end of the cylindrical housing in operation, the piston head and the compressible accumulator are displaced toward the distal end of the cylindrical housing.

According to an embodiment, the compressible accumulator is arranged within the piston head and connected to the piston rod.

According to an embodiment, when the piston rod is displaced toward the proximal end of the cylindrical housing in operation, the piston head and the compressible accumulator are displaced toward the proximal end of the cylindrical housing.

According to an embodiment, the device further includes at least one sliding bearing surface arranged at an exterior of the piston head to allow the piston to slide within the cylindrical housing.

According to an embodiment, the at least one sliding bearing surface is at a distal end of the piston head.

According to an embodiment, the at least one sliding bearing surface includes at least one space to allow fluid to flow past a portion of the piston head.

According to an embodiment, the device further includes an annular protrusion arranged at an exterior surface of the piston head to provide a resistive force.

According to an embodiment, the annular protrusion is at a proximate end of the piston head.

According to another aspect, a hydraulic energy absorption device is provided. The hydraulic energy absorption device includes (i) a cylindrical housing having an interior hollow compartment, the interior hollow compartment having a distal end and a proximal end; (ii) a resilient member arranged within the distal end of the cylindrical housing; (iii) a piston arranged adjacent to the resilient member within the cylindrical housing, the piston including a piston head and a piston rod extending from the piston head toward the proximal end; (iv) a compressible accumulator arranged within the cylindrical housing and connected to the piston; and, (v) at least one sliding bearing surface arranged at an exterior of the piston head to allow the piston to slide within the cylindrical housing.

According to an embodiment, the compressible accumulator is arranged within the piston head and connected to the piston rod.

According to an embodiment, the resilient member is a spring.

According to an embodiment, the resilient member contacts the piston to urge the piston toward the proximal end of the cylindrical housing.

According to an embodiment, in response to the piston rod being displaced toward the distal end of the cylindrical housing, the piston head and the compressible accumulator are displaceable toward the distal end of the cylindrical housing in operation.

According to an embodiment, the device further includes an annular protrusion arranged at a first end of the piston head and the at least one sliding bearing surface is at a second end of the piston head, opposite of the first end.

According to a further aspect, a hydraulic energy absorption device is provided. The device includes (i) a cylindrical housing having an interior hollow compartment, the interior hollow compartment having a distal end and a proximal end; (ii) a resilient member arranged within the distal end of the cylindrical housing; (iii) a piston arranged adjacent to the resilient member within the cylindrical housing, the piston including a piston head and a piston rod extending from the piston head toward the proximal end; (iv) a compressible accumulator arranged within the cylindrical housing and connected to the piston; (v) at least one sliding bearing surface arranged at an exterior at a first end of the piston head to allow the piston to slide within the cylindrical housing; and, (vi) an annular protrusion arranged at a second end of the piston head, opposite of the first end. At least a portion of the compressible accumulator is arranged between the at least one sliding bearing surface and the annular protrusion.

According to an embodiment, the compressible accumulator is arranged within the piston head and connected to the piston rod.

According to an embodiment, at least a portion of the piston rod is outside of the cylindrical housing and connected to an external body.

According to an embodiment, the device further includes at least one further sliding bearing surface.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION OF EMBODIMENTS

A description of example embodiments of the invention follows.

The example embodiments include an accumulator that is part of (either integral or attached to) a piston head of a recoil buffer or a shock absorber. This allows the recoil buffer or the shock absorber to be more stable as it is stroked because the length of the bearing components of the device is effectively increased during compression, which results in a more reliable and stable resisting force reducing high frequency harmonics. Because the accumulator travels with the piston head, the compression of the accumulator is more stable and controlled, resulting in a consistent/controlled compression, which helps stabilize fluid flow and irregularities associated with uncontrolled flow that an unconstrained open accumulator would have otherwise. This controlled expansion and compression of the accumulator leads to more stable resistance forces. Since the accumulator compression occurs relative to the amount the shock is stroked, the accumulator requires less response time to function.

Figure 1:
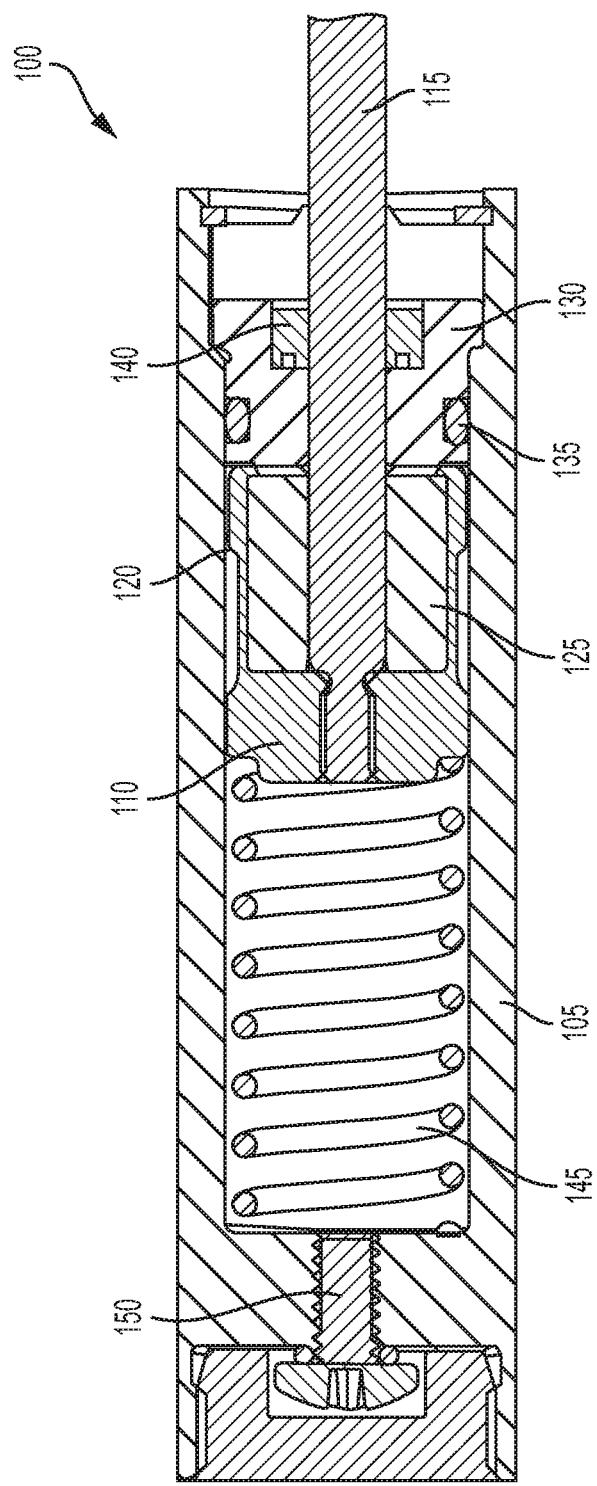
FIG. 1 is a cross-sectional schematic representation of an energy absorption device, in accordance with an embodiment of the present disclosure.

Referring now to the drawings, wherein like reference numerals refer to like parts throughout, there is seen in FIG. 1 a cross-sectional schematic drawing of an energy absorption device 100 according to an example embodiment of the present disclosure. FIG. 1 shows example components of the device 100 in alignment with each other. The embodiment shown in FIG. 1 includes a cylindrical housing member 105, a piston 110, 115, and an inertial accumulator 125, along with other components including a bearing 130, seals 135, 140, a resilient member 145 (for example, a spring), and a fill plug 150. The cylindrical housing 105 has an interior hollow compartment, a distal end, and a proximal end. The piston includes a piston head 110, an inertial accumulator 125, and a piston rod 115, where the piston head 110 is slidably retained within the cylindrical housing 105, and the piston rod 115 extends from the piston head 110 through the proximal end of the cylindrical housing 105. The inertial accumulator 125 can be integral or connected. The piston rod 115 is configured to be engaged with an external body (not shown), such engagement being either directly between the piston rod 115 and body or through an intermediary component, such as a coupling, abutment, or other interface. The inertial accumulator 125 is coupled to the piston head 110 (integrally or connected) on the proximate side of the piston head 110 and collects fluid from the interior of the cylindrical housing 105 displaced by the piston rod 115 when the piston head 110 moves toward the distal end of the cylindrical housing 105 and the piston rod 115 is introduced into the interior of the cylindrical housing 105. In an example embodiment, compressible liquid may also be used instead. An accumulating component is required to prevent the device from hydraulically locking because the closed space of the cylindrical housing 105 would not otherwise be capable of accepting the additional volume of the piston rod 115 when the portion of the piston rod 115 that was outside of the cylindrical housing 105 is introduced into the cylindrical housing 105 upon compression of the device 100. Accumulating components are regularly made of a closed-cell foam containing gas within the foam that can compress, unlike hydraulic fluid. However, it should be appreciated that the accumulator can be made of any suitable material.

The piston head 110 of the device 100 includes one or more sliding bearing surfaces 305 (FIG. 3) at the distal end of the piston head 110, and an annular protrusion 310 (FIG. 3) at the proximate end of the piston head 110 that creates an annular orifice 120 between the protrusion 310 (FIG. 3) and the interior surface of the cylindrical housing 105. According to an embodiment, the annular orifice 120 embodies various geometries to obtain a wide range of velocity power functions. The annular protrusion 310 can be any suitable shape, for example, an annular depression.

The remaining components (bearing 130, seals 135,140, spring 145, and fill plug 150) shown in FIG. 1 are typical components of many recoil buffers and shock absorbers. They can, of course, vary from device to device. For example, some devices use a spring, while others do not. In the embodiment shown in FIG. 1, the bearing 130 acts as a support for the piston by supporting the piston rod 115. The sliding bearing surface described herein changes in length as the device is stroked in order to provide additional stability, life, and performance. The seals 135, 140 help enable the device 100 to maintain its fluid within the cylindrical housing 105. Seal 135 is an o-ring seal, and seal 140 is a wiper seal for example. The spring 145 helps the piston return to its uncompressed position. The fill plug 150 allows the fluid of the device to be drained or replaced.

In an alternative design, the device may include a cylinder within the cylindrical housing. The cylinder has at least one orifice passing from its interior surface to its exterior surface to allow fluid to pass therethrough. The cylinder is positioned between the cylindrical housing and the piston, and a flow channel is formed on an interior wall of the cylindrical housing that substantially extends along the length of the cylindrical housing and is in fluid communication with the accumulator. Fluid from one side of the piston head flows through the cylinder orifice(s), through the flow channel, and to the other side of the piston head.

Figure 2:
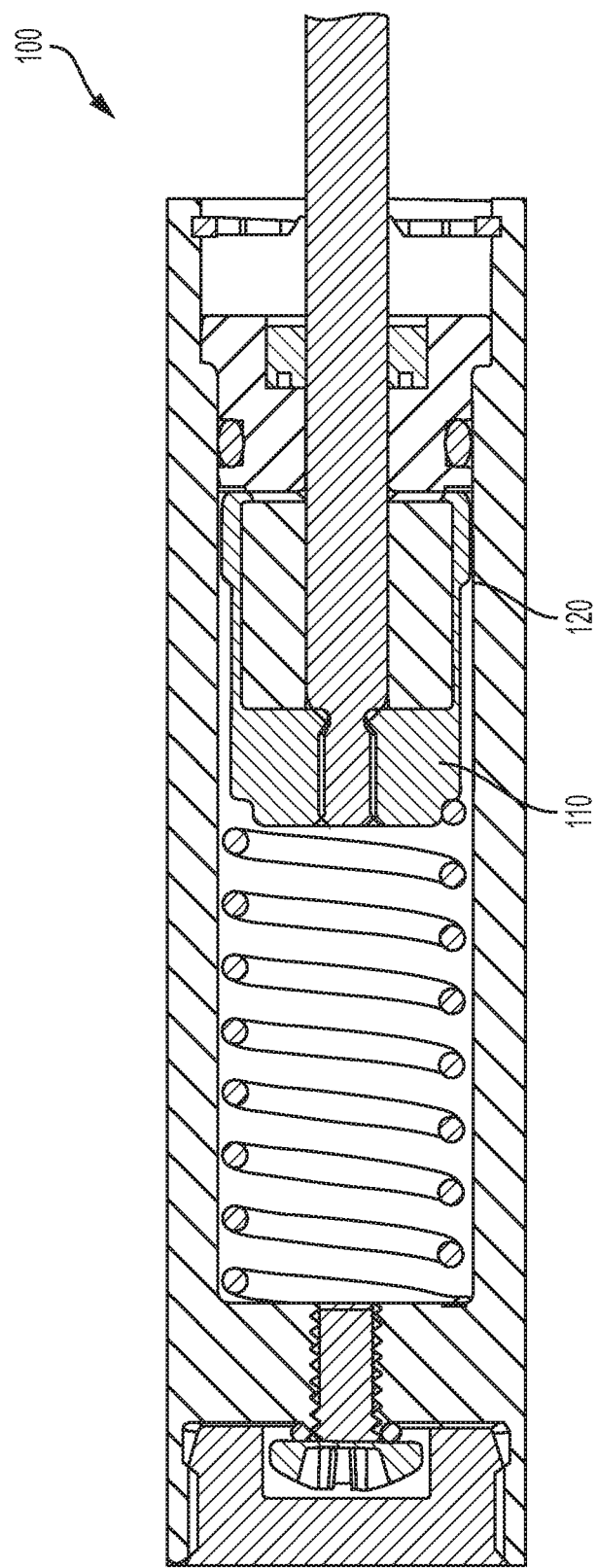
FIG. 2 is a cross-sectional schematic representation of the energy absorption device of FIG. 1 rotated 45 degrees axially, in accordance with an embodiment of the present disclosure.

FIG. 2 is a cross-sectional schematic representation of the energy absorption device 100 of FIG. 1 rotated 45 degrees axially about the longitudinal axis. The components of the particular device 100 of FIGS. 1 and 2 are substantially symmetrical, the main difference between the figures being that the sliding bearing surfaces 305 (FIG. 3) appear different in FIG. 2, as is shown in more detail in FIGS. 3-8. In other words, spaces are shown between the sliding bearing surfaces 305 and the cylindrical housing 105 to allow fluid to flow from the distal end of the piston head 110 toward the proximal end of the cylindrical housing or from the proximal end toward the distal end depending on how the features are arranged.

Figure 3:
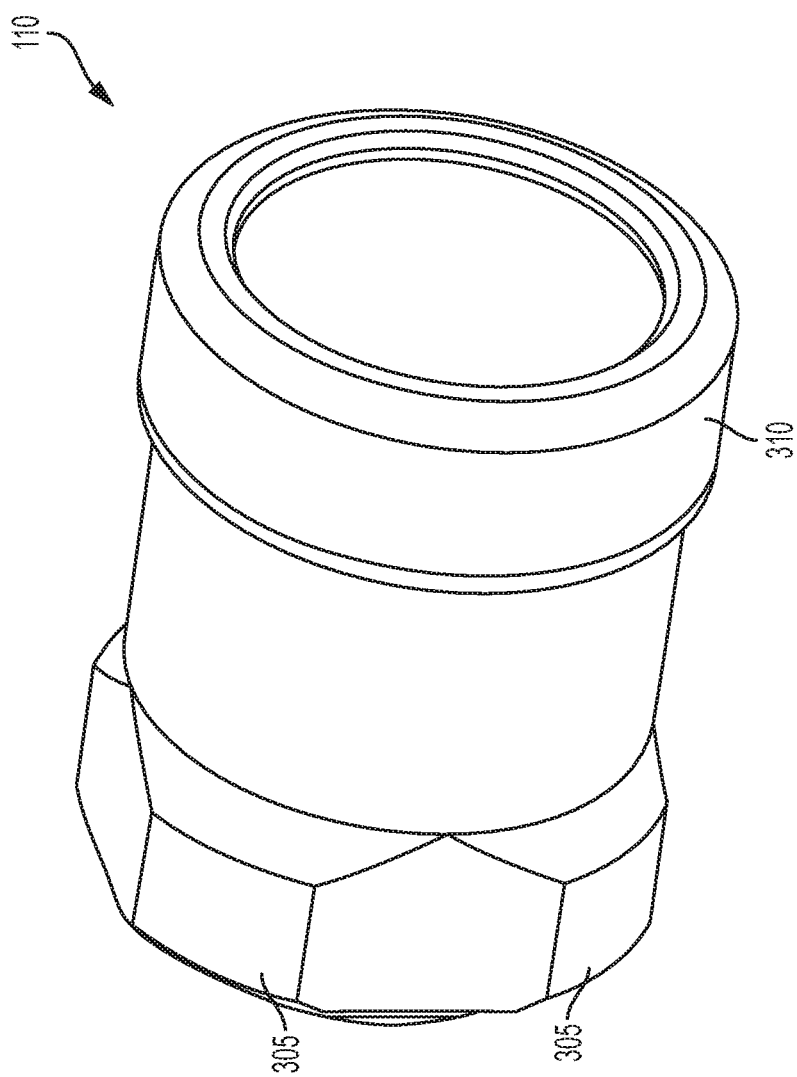
FIG. 3 is a schematic representation of a piston head, in accordance with an embodiment of the present disclosure.

FIG. 3 is a schematic representation of an example piston head 110 according to an example embodiment of the present disclosure. As shown, the piston head 110 includes one or more sliding bearing surfaces 305 at the distal end of the piston head 110, and an annular protrusion 310 at the proximate end of the piston head 110. The spaces between the sliding bearing surfaces 305 allow fluid to flow past the distal end of the piston head 110 with little resistance because a very small boundary layer growth is permitted, while the annular protrusion 310 is the primary feature of the piston head 110 that creates a resistive damping force. The sliding bearing surfaces 305 provide support for the piston in addition to the support provided by the stationary bearing 130 (FIG. 1). In alternative embodiments, the sliding bearing surfaces can be located at the proximate end of the piston head 110 and the annular protrusion can be located at the distal end.

Figure 4:
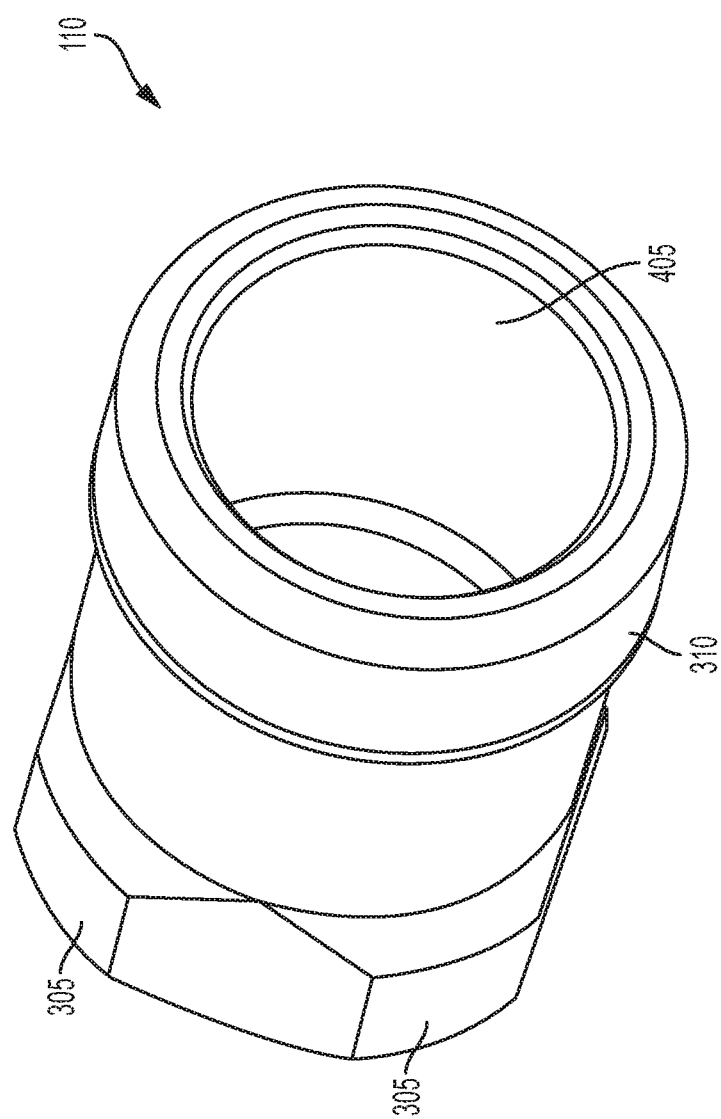
FIG. 4 is a schematic representation of the piston head of FIG. 3, in accordance with an embodiment of the present disclosure.

FIG. 4 is a schematic representation of the piston head 110 of FIG. 3 viewed from another angle and showing more of the interior surface of the example piston head 100 towards its proximate end. The inertial accumulator 125 (FIG. 1) can be located in the space 405 inside the proximate end of the piston head 110 or it can be connected to the piston head 110. If the piston head 110 is configured to include space 405 at the distal end, the inertial accumulator can be located in the space at the distal end or it can be connected at the distal end.

Figure 5:
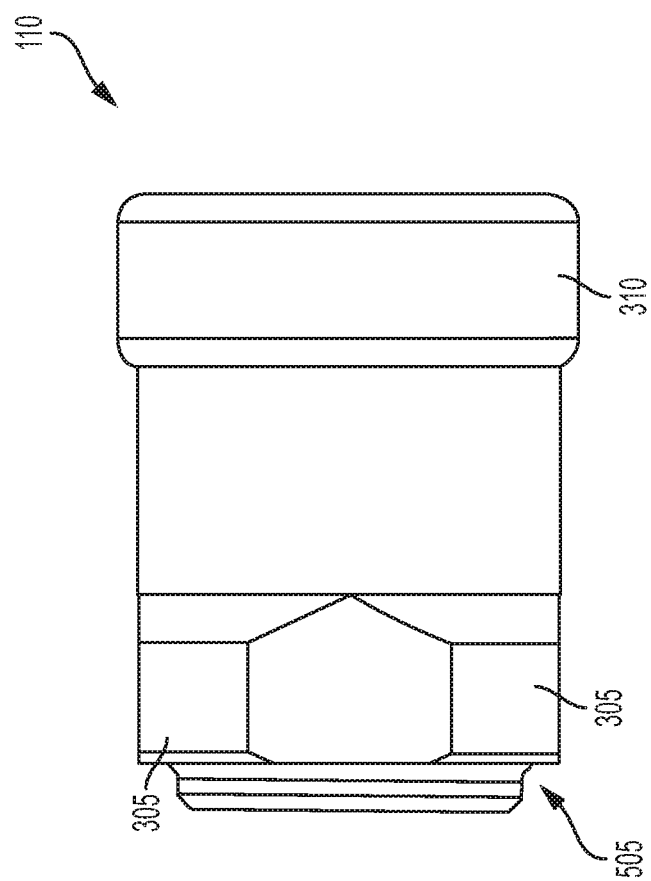
FIG. 5 is a schematic representation of a side view of the piston head of FIG. 3, in accordance with an embodiment of the present disclosure.

FIG. 5 is a schematic representation of the piston head 110 of FIG. 3 viewed from the side. Shown in FIG. 5 are the sliding bearing surfaces 305, annular protrusion 310, and a retainer 505 for a spring 145 (FIG. 1).

Figure 6:
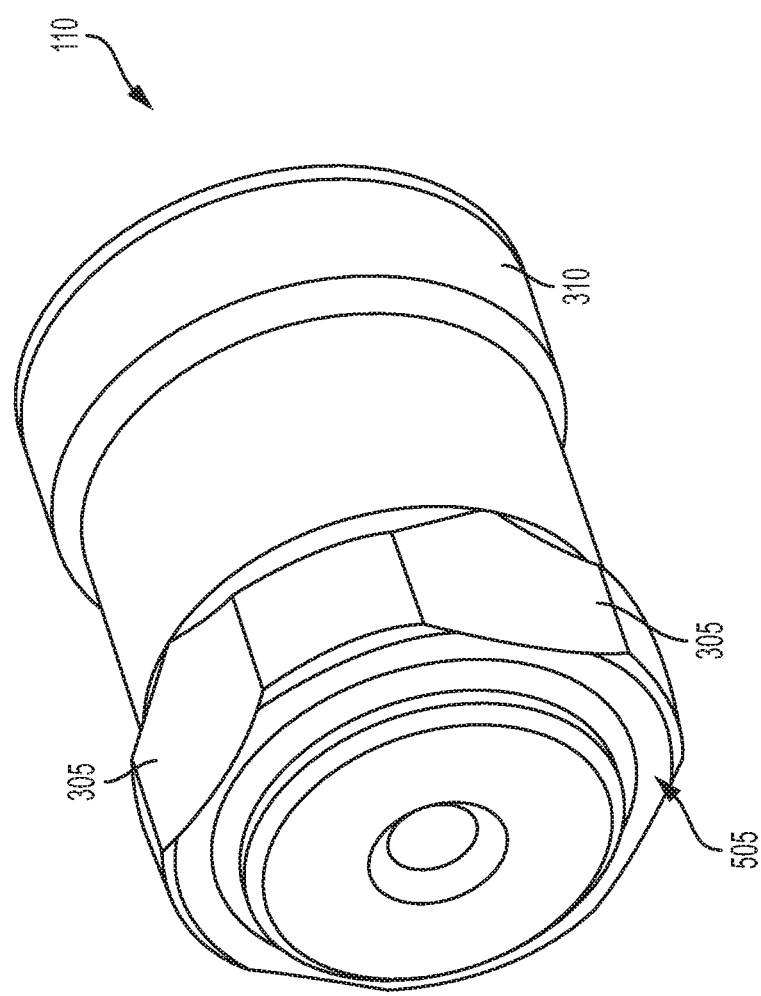
FIG. 6 is a schematic representation of the piston head of FIG. 3, in accordance with an embodiment of the present disclosure.

FIG. 6 is a schematic representation of the piston head 110 of FIG. 3 viewed from another angle and showing the sliding bearing surfaces 305, annular protrusion 310, and spring retainer 505 of the example piston head 110.

Figure 7:
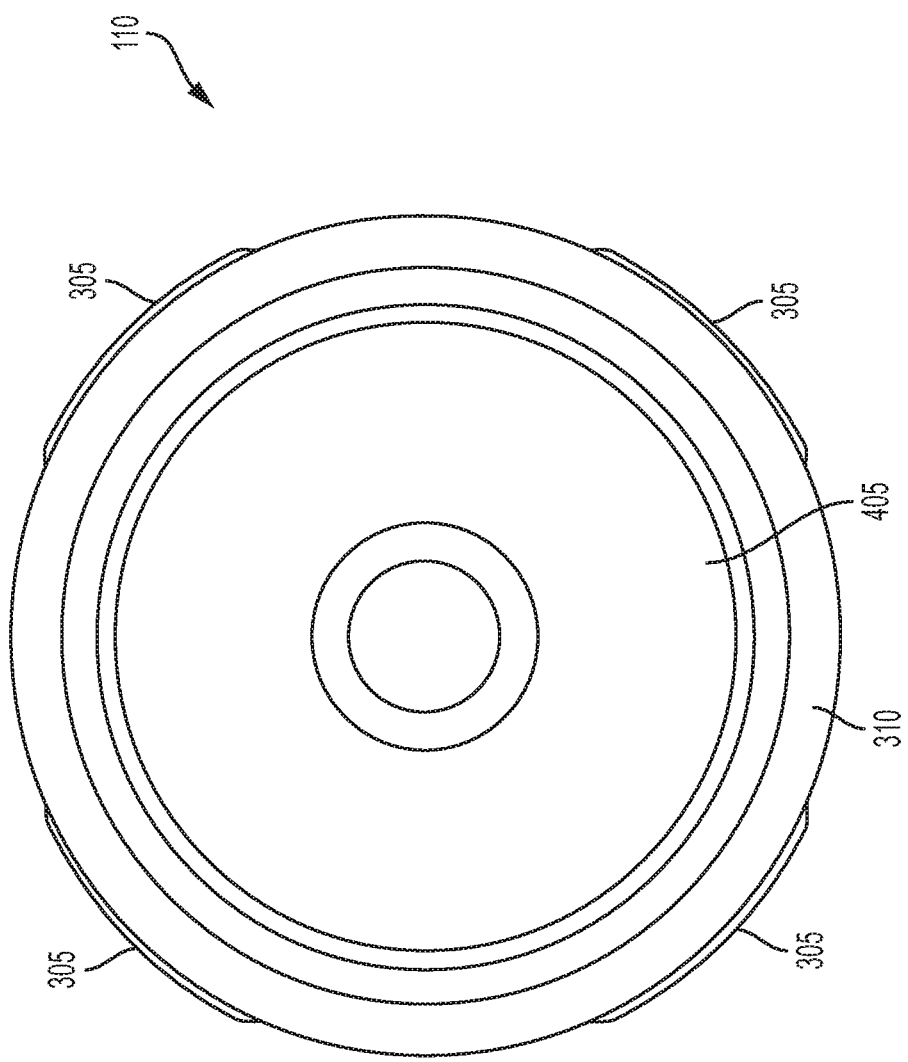
FIG. 7 is a schematic representation of the piston head of FIG. 3 viewed from its proximate end, in accordance with an embodiment of the present disclosure.

FIG. 7 is a schematic representation of the piston head 110 of FIG. 3 viewed from its proximate end. Shown in FIG. 7 are the sliding bearings 305, annular protrusion 310, and space 405 for the inertial accumulator 125 (FIG. 1).

Figure 8:
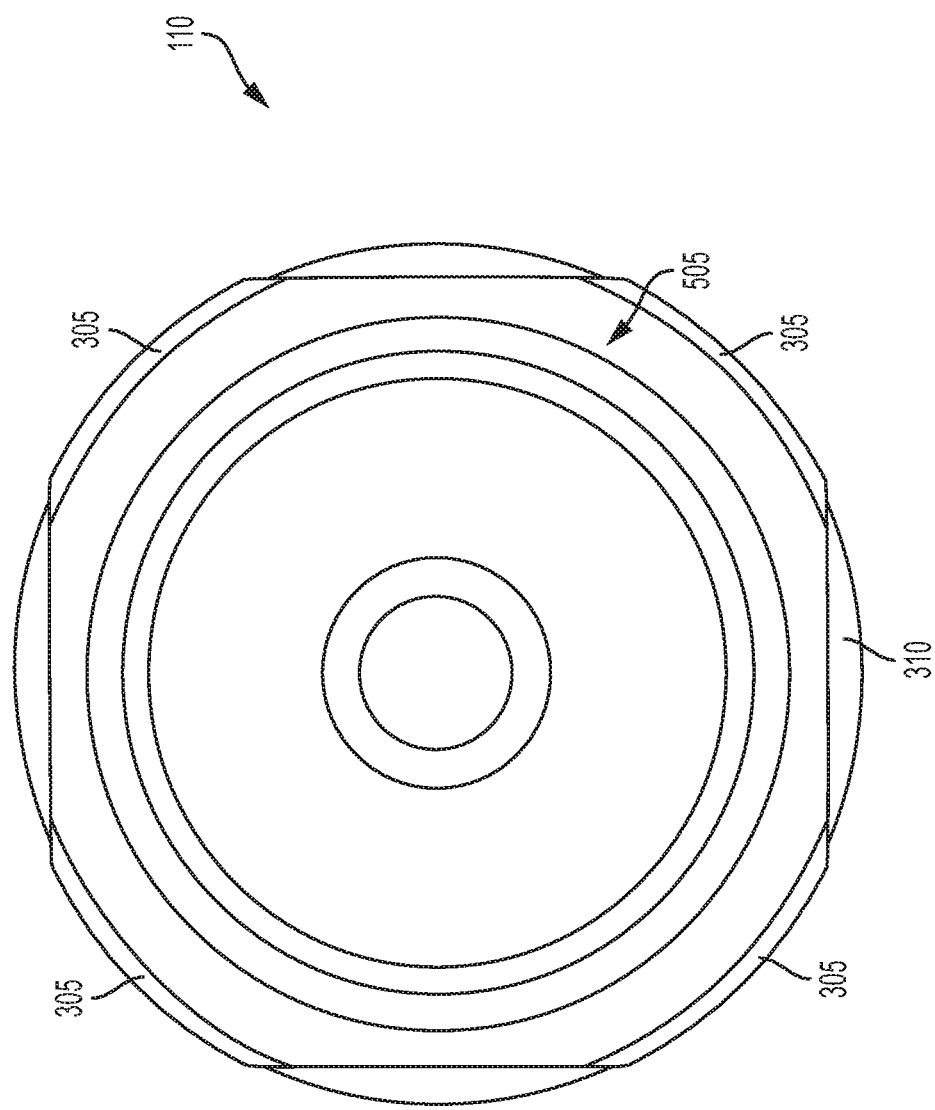
FIG. 8 is a schematic representation of the piston head of FIG. 3 viewed from its distal end, in accordance with an embodiment of the present disclosure.

FIG. 8 is a schematic drawing of the piston head 110 of FIG. 3 viewed from its distal end. Shown in FIG. 8 are the sliding bearings 305, annular protrusion 310, and spring retainer 505.

Figure 9:
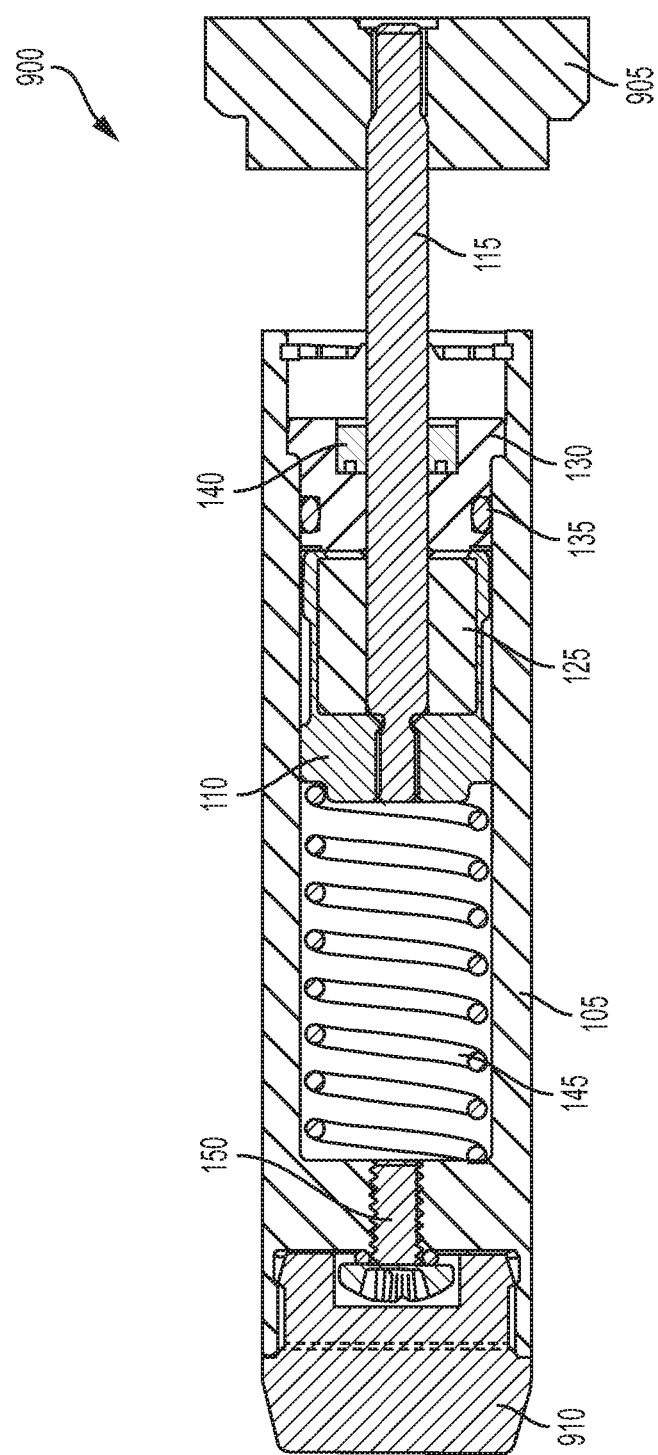
FIG. 9 is a cross-sectional schematic representation of an energy absorbing recoil buffer, in accordance with an embodiment of the present disclosure.

FIG. 9 is a cross-sectional schematic representation of an energy absorbing recoil buffer or shock absorber according to an example embodiment of the present disclosure. A hydraulic recoil buffer has the potential to reduce recoil, muzzle flip, and muzzle rise or drift, and improve clustering when installed in a firearm. Use of recoil buffers in firearms has been well known for decades. However, due to the moving accumulator design, use of the disclosed shock absorber as a recoil buffer in a firearm can result in significantly more stable shock absorption and, thus, more stable recoil of the firearm.

Similar to the device of FIG. 1, the recoil buffer of FIG. 9 includes a cylindrical housing 105, a piston 110, 115, and an inertial accumulator 125, along with other components including a bearing 130, seals 135, 140, a spring 145, and a fill plug 150. The cylindrical housing 105 has a distal end and a proximal end, and the piston includes a piston head 110 and a piston rod 115, where the piston head 110 is slidably retained within the cylindrical housing 105, and the piston rod 115 extends from the piston head 110 through the proximal end of the cylindrical housing 105. The piston rod 115 is configured to be engaged with an external body (not shown). The inertial accumulator 125 is coupled to the piston head 110 on the proximate side of the piston head 110 and collects fluid from the interior of the cylindrical housing 105 displaced by the piston rod 115 when the piston head 110 moves toward the distal end of the cylindrical housing 105 and the piston rod 115 is introduced into the interior of the cylindrical housing 105. The inertial accumulator 125 can be integrated within the piston head 110 or otherwise connected to the piston head 110. The piston head 110 of the device 100 includes one or more sliding bearing surfaces 305 (FIG. 3) at the distal portion of the piston head 110, and an annular protrusion 310 (FIG. 3) at the proximate end of the piston head 110 that creates an annular orifice 120 between the protrusion 310 (FIG. 3) and the interior surface of the cylindrical housing 105.

The remaining components (bearing 130, seals 135, 140, spring 145, and fill plug 150) shown in FIG. 9 are typical components of many shock absorbers. The bearing 130 acts as a support for the piston by supporting the piston rod 115. The seals 135, 140 help enable the device 100 to maintain its fluid within the cylindrical housing 105. Seal 135 is an o-ring seal, and seal 140 is a wiper seal, although other suitable alternatives may be used instead. The spring 145 helps the piston return to its uncompressed position. The fill plug 150 allows the fluid of the device to be drained or replaced. The additional components of the device 900 of FIG. 9 include a bumper 910 component located at the distal end of the cylindrical housing 105 and a component 905 at the distal end of the piston rod 115 configured to interface an external body (not shown).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A hydraulic energy absorption device, comprising:
   a cylindrical housing having an interior hollow compartment, the interior hollow compartment having a distal end and a proximal end;
   a resilient member arranged within the distal end of the cylindrical housing;
   a piston arranged adjacent to the resilient member within the cylindrical housing, the piston including a piston head and a piston rod extending from the piston head toward the proximal end; and,
   a compressible accumulator connected to the piston and arranged between the piston rod and an axially extending member within the cylindrical housing and configured to be displaced within the cylindrical housing, wherein the compressible accumulator is arranged around the piston rod;
   wherein when the piston rod is displaced toward the distal end of the cylindrical housing in operation, the piston head and the compressible accumulator are displaced toward the distal end of the cylindrical housing and fluid flows past an exterior of the piston head and an exterior of the axially extending member.

2. The hydraulic energy absorption device of claim 1, wherein when the piston rod is displaced toward the proximal end of the cylindrical housing in operation, the piston head and the compressible accumulator are displaced toward the proximal end of the cylindrical housing.

3. The hydraulic energy absorption device of claim 1, further comprising at least one sliding bearing surface arranged at an exterior of the piston head to allow the piston to slide within the cylindrical housing.

4. The hydraulic energy absorption device of claim 3, wherein the at least one sliding bearing surface is at a distal end of the piston head.

5. The hydraulic energy absorption device of claim 3, wherein the at least one sliding bearing surface includes at least one space to allow fluid to flow past a portion of the piston head.

6. The hydraulic energy absorption device of claim 1, further comprising an annular protrusion arranged at an exterior surface of the piston head to provide a resistive force.

7. The hydraulic energy absorption device of claim 6, wherein the annular protrusion is at a proximate end of the piston head.

8. The hydraulic energy absorption device of claim 1, wherein the compressible accumulator is arranged within the piston head and connected to the piston rod.

9. A hydraulic energy absorption device, comprising:
a cylindrical housing having an interior hollow compartment, the interior hollow compartment having a distal end and a proximal end;
a resilient member arranged within the distal end of the cylindrical housing;
a piston arranged adjacent to the resilient member within the cylindrical housing, the piston including a piston head and a piston rod extending from the piston head toward the proximal end;
a compressible accumulator connected to the piston and arranged between the piston rod and an axially extending member within the cylindrical housing and configured to be displaced within the cylindrical housing, wherein the compressible accumulator is arranged around the piston rod; and,
at least one sliding bearing surface arranged at an exterior of the piston head to allow the piston to slide within the cylindrical housing, wherein the at least one sliding bearing surface includes at least one space to allow fluid to flow past a portion of the piston head; and
when the piston slides toward the distal end of the cylindrical housing in operation, no fluid flows from the distal end to the proximal end through the piston head.

10. The hydraulic energy absorption device of claim 9, wherein the resilient member is a spring.

11. The hydraulic energy absorption device of claim 9, wherein the resilient member contacts the piston to urge the piston toward the proximal end of the cylindrical housing.

12. The hydraulic energy absorption device of claim 9, wherein in response to the piston rod being displaced toward the distal end of the cylindrical housing, the piston head and the compressible accumulator are displaceable toward the distal end of the cylindrical housing in operation.

13. The hydraulic energy absorption device of claim 9, further comprising an annular protrusion arranged at a first end of the piston head and the at least one sliding bearing surface is at a second end of the piston head, opposite of the first end.

14. The hydraulic energy absorption device of claim 9, wherein the compressible accumulator is arranged within the piston head and connected to the piston rod.

15. A hydraulic energy absorption device, comprising:
a cylindrical housing having an interior surface and an interior hollow compartment, the interior hollow compartment having a distal end and a proximal end;
a resilient member arranged within the distal end of the cylindrical housing;
a piston arranged adjacent to the resilient member within the cylindrical housing, the piston including a piston head and a piston rod extending from the piston head toward the proximal end;
a compressible accumulator connected to the piston and arranged between the piston rod and an axially extending member within the cylindrical housing and configured to be displaced within the cylindrical housing, wherein the compressible accumulator is arranged around the piston rod;
at least one sliding bearing surface arranged at an exterior at a first end of the piston head to allow the piston to slide within the cylindrical housing; and,
an annular protrusion arranged at a second end of the piston head, opposite of the first end, the annular protrusion creating an annular orifice between the annular protrusion and the interior surface of the cylindrical housing;
wherein at least a portion of the compressible accumulator is arranged between the at least one sliding bearing surface and the annular protrusion; and
when the piston is displaced toward the distal end of the cylindrical housing in operation, no fluid flows from the distal end to the proximal end through the piston head.

16. The hydraulic energy absorption device of claim 15, wherein at least a portion of the piston rod is outside of the cylindrical housing and connected to an external body.

17. The hydraulic energy absorption device of claim 15, further comprising at least one further sliding bearing surface.

18. The hydraulic energy absorption device of claim 15, wherein the compressible accumulator is arranged within the piston head and connected to the piston rod.

* * * * *